United States Patent [19]

Fowler

[11] 4,318,563
[45] Mar. 9, 1982

[54] EXTRACTOR BAR

[75] Inventor: Roscoe T. Fowler, New York, N.Y.

[73] Assignee: DCA Food Industries, Inc., New York, N.Y.

[21] Appl. No.: 99,837

[22] Filed: Dec. 3, 1979

[51] Int. Cl.³ .............................................. B65B 5/08
[52] U.S. Cl. ............................................... 294/87 SH
[58] Field of Search ..... 294/87 SH; 24/244, 263 SW; 425/436, 126 S, 114

[56] References Cited

U.S. PATENT DOCUMENTS

| | | | |
|---|---|---|---|
| 481,455 | 8/1892 | Worden | 24/244 |
| 867,199 | 9/1907 | Jack | 24/244 |
| 940,728 | 11/1909 | Reece | 24/244 |
| 1,309,125 | 7/1919 | Ford | 24/244 |
| 1,414,541 | 5/1922 | Arey et al. | 24/244 |
| 1,494,252 | 5/1924 | Kane | 24/244 |
| 1,550,103 | 8/1925 | Schumacher | 24/244 |
| 1,960,456 | 5/1934 | Robb | 425/436 |
| 2,109,473 | 3/1938 | Elwell | 294/87 SH |
| 2,274,625 | 2/1942 | Thomas et al. | 294/87 SH |
| 2,741,398 | 9/1956 | Wiesner | 425/436 |
| 2,894,652 | 7/1959 | Glass | 425/436 |
| 2,925,052 | 2/1960 | Glass | 425/436 |
| 2,953,997 | 9/1960 | Glass | 425/436 |
| 2,998,774 | 9/1961 | Glass | 425/126 SH |
| 3,031,978 | 5/1962 | Rasmussen | 425/126 SH |
| 3,407,755 | 10/1968 | Rasmussen | 425/126 |
| 3,648,625 | 3/1972 | Glass | 425/114 |
| 3,695,895 | 10/1972 | Brown | 425/436 |
| 3,947,208 | 3/1976 | Broderick | 425/436 |

Primary Examiner—James B. Marbert
Attorney, Agent, or Firm—Amster, Rothstein & Engelberg

[57] ABSTRACT

An extractor bar assembly for use in a frozen stick-mounted confection forming machine, adapted to remove the frozen stick-mounted confection products from their associated molds by engaging each stick in a substantially vertical direction using a cam locking mechanism. The cam locking mechanism is comprised of a plurality of tubular segments flotably mounted on a support rod which in turn is movably mounted within a V-shaped trough forming the body portion of the extractor bar assembly. The individual sticks enter through an opening provided along the bottom of the V-shaped trough and are held within the extractor bar by a cam locking mechanism. To release the individual sticks from the extractor bar, a release mechanism is provided with enters the trough through an aperture located on the bottom edge of the extractor bar and displaces the cam locking mechanism in an upward direction.

8 Claims, 6 Drawing Figures

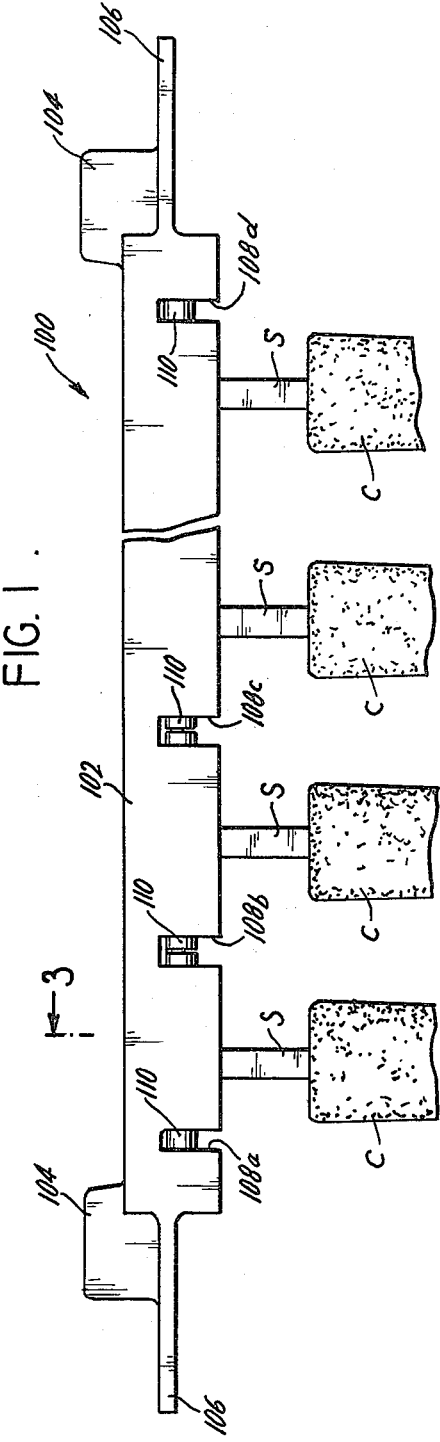
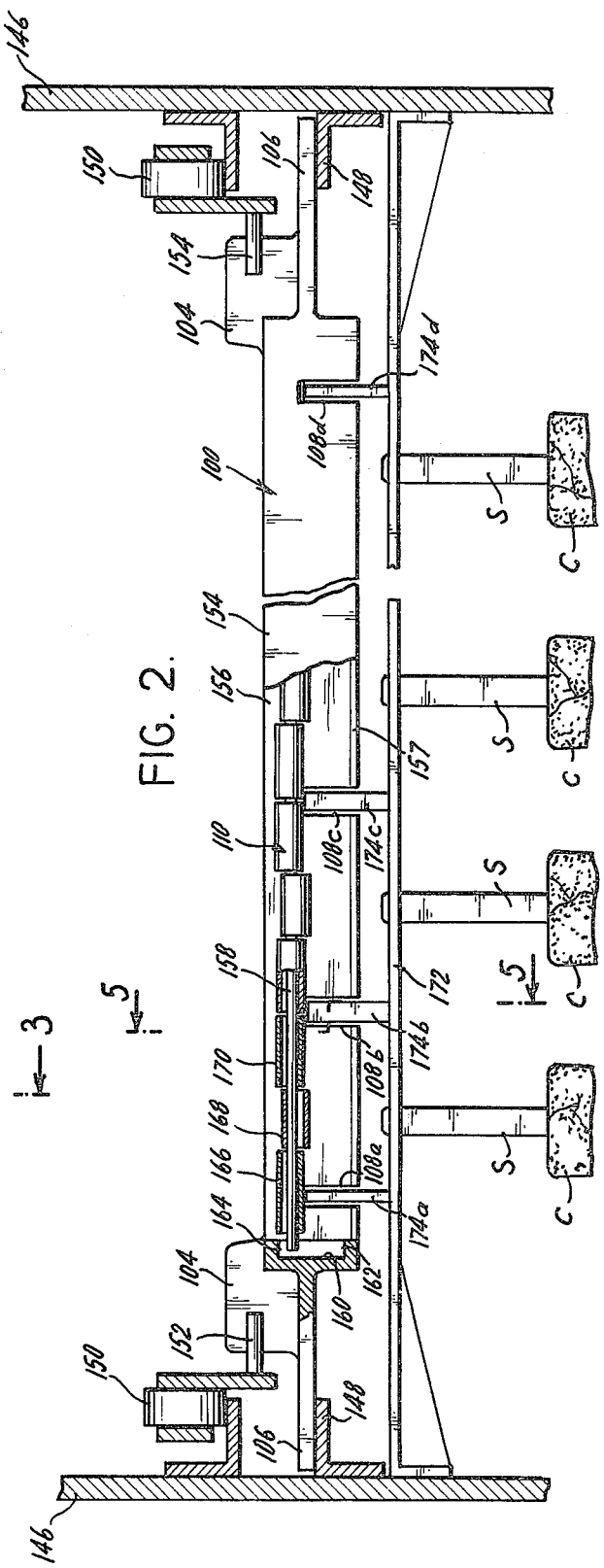

EXTRACTOR BAR

BACKGROUND OF THE INVENTION

This invention relates in general to an extractor bar assembly for use in a frozen stick-mounted confection forming machine and, more particularly, to an extractor bar assembly having a cam locking mechanism within a V-shaped trough of the extractor bar for removing frozen stick-mounted confection products from their respective forming molds.

In the manufacture of frozen stick-mounted confection products a liquid confection is introduced into a forming mold that is advanced through a chilled brine solution. As the mold is advanced through the brine solution and while the confection is still in a semi-solid state, a stick is inserted into the confection in the mold. By the time the mold completes its travel through the brine, a fully frozen assembly of confection is formed around the stick. The confection and stick assembly is removed from the forming mold by an extractor bar assembly which typically removes a plurality of side-by-side confection and stick assemblies, and suspends them by their sticks and advances the assemblies through the remainder of the confection forming machine.

The extraction is critical in that the entire frozen confection must be removed from the mold in a manner that avoids physical destruction of the attractive shape and appearance of the frozen confection product.

As the extractor bar approaches the end of the machine cycle, the frozen confection products must be simultaneously released from the extractor bar for subsequent packaging and shipping. Failure of the extractor bar to completely release a frozen stick-mounted confection product will result in its retention within the extractor bar and the corresponding loss of product.

A conventional extractor bar adapted for use in a frozen stick-mounted confection forming machine contains a plurality of blades mounted to the extractor bar by the engagement of a spring retainer. There are no provisions for permanent retention of the blades and springs to the bar, the assembly being dependent totally on spring tension.

When the extractor bar is lowered to extract a stick-mounted confection product from its mold, the stick is caused to pass through a slot in the extractor bar into engagement with one end of the blade. The stick being in contact with the blade causes the spring loaded blade to rotate away from the body of the extractor bar enough for the stick to become fixed between the blade edge and the body of the extractor bar. The frozen stick-mounted confection product is then extracted from its mold by substantially vertical movement of the extractor bar relative to the mold. The extractor bar advances the frozen stick-mounted confection through the remainder of the machine for subsequent treatment, i.e., dipping, coating, etc., and finally to a release station for removal of the finished confection product by a trip bar contacting the other end of the blade and rotating the blade sufficiently to release the stick from the blade edge and the back side of the extractor bar.

There are a number of disadvantages associated with the conventional extractor bar. For example, since the blades and springs are not fastened to the extractor bar, during operation of the confection machine some loss of blades and springs may occur resulting in a corresponding loss of product. Further, after a period of continuous use of the extractor bars, the springs become weaker and the contact edge of the blades become dull and smooth. When this happens, the stick-mounted confection products can not be sufficiently locked within the extractor bar to extract the frozen stick-mounted confections from their molds, thereby resulting in an additional loss of product. Even with all the blades and springs in place on the extractor bar, there are a number of operative elements that contribute to corrosion of the blade and spring assembly. When this develops in the radial bearing surface of the blade mounting, the blade will not reset and thereby remain open and inoperative for extracting the frozen stick-mounted confection products. Alternatively, the blades may become so immobile as to prevent release of the frozen stick-mounted confection products thereby resulting in additional product loss.

SUMMARY OF THE INVENTION

It is broadly an object of this invention to provide an extractor bar assembly for use in a frozen stick-mounted confection forming machine which overcomes or avoids one or more of the foregoing disadvantages of the conventional extractor bar.

Specifically, it is within the contemplation of the present invention to provide an extractor bar assembly incorporating a novel combination locking and releasing mechanism to extract a plurality of side-by-side frozen confections molded on a stick from their respective forming molds and to carry the frozen stick-mounted confections to subsequent stations in an otherwise conventional confection forming machine.

A further object of the present invention is to provide an extractor bar assembly that can effectively lock sticks of nonuniform cross-section within the extractor bar.

A still further object of the present invention is to provide an extractor bar assembly that provides for positive, uniform releasing of the frozen stick-mounted confection products from the extractor bar at a desired location within a cycle of a frozen-stick confection machine.

A still further object of the present invention is to provide an extractor bar assembly that contains no unfastened parts.

A still further object of the present invention is to provide an assembly that can be conventionally constructed from materials which are non-corrosive in the environment of a frozen confection forming machine.

A still further object of the present invention is to provide an extractor bar assembly that can extract frozen-stick mounted confection products having more than one mounting stick and of various stick to stick center distance.

In accordance with one embodiment of the present invention, there is provided a combination stick locking and releasing device for use in a frozen stick-mounted confection forming machine having a pair of opposed longitudinally extending members which are downwardly converging to define a trough having a longitudinally extending bottom opening formed between the members. An assembly comprised of a longitudinally extending support and a plurality of locking devices, sleeves or segments positioned along the length of the support, is mounted within the trough, movable between a first, stick locking position and a second, stick releasing position. When in the first, stick locking position a stick entering the trough through the bottom opening will be retained between one of the locking devices and one of the longitudinally extending members.

In the second position the frozen stick-mounted frozen confection and products are released from the extractor bar assembly. The assembly is movable from the first stick locking position to the second stick releasing position by the displacement of said assembly due to engagement of a release bar or cam entering said trough through a transverse aperture located on the bottom edge of the converging members.

BRIEF DESCRIPTION OF THE DRAWINGS

The above brief description as well as further objects, features and advantages of the present invention will be more fully understood by reference to the following detailed description of the presently preferred, but nonetheless illustrative, extractor bar assembly in accordance with the present invention when taken in conjunction with the accompanying drawings, wherein:

FIG. 1 is a side elevation of the extractor bar showing four frozen stick-mounted confection products being engaged by the extractor bar;

FIG. 2 is a partially sectioned, side elevation showing the extractor bar assembly having its locking mechanism in the releasing position;

DETAILED DESCRIPTION OF THE PREFERRED EMBODIMENT

Figure 3:
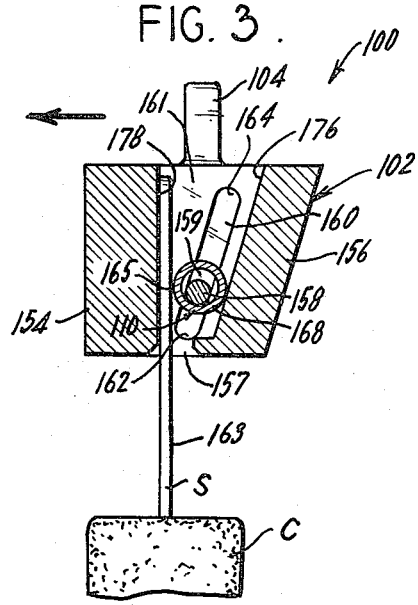
FIG. 3 is a section view taken along line 3—3 in FIG. 1 showing the locking mechanism in engagement with a flat stick mounted confection product.

FIG. 1 generally shows an extractor bar assembly 100 of the present invention. The extractor bar assembly 100 is comprised of a longitudinally extending rigid housing 102 which may be fabricated from a wide variety of materials, which are sufficiently strong and noncorrosive in the environment of the frozen stick-mounted confection forming machine, such as, stainless steel. The housing is constructed in such a manner so as to form a V-shaped trough (see FIGS. 3, 4 and 6) extending longitudinally along the length of the housing. At each end of the housing, there is a vertically extending ear 104 and a horizontally extending tab 106. The function of the ears and tabs will be described hereafter. Along the bottom of the housing there are a plurality of apertures 108(a)-108(d) which extend from the front side to the back side of the housing and vertically upward into the V-shaped trough such that the apertures provide a passageway to a cam lock roller 110 mounted within the trough. As shown in FIG. 1, a portion of the locking means of the cam lock roller is accessible through the aperture.

A plurality of frozen stick-mounted confection products C are shown mounted on their respective sticks S which are, in turn, engaged by extractor bar assembly 100. In operation, when descending, the extractor bar assembly 100 engages the sticks S and moves vertically upward to remove the frozen confection stickmounted confection products from their respective forming molds. The extractor bar assembly 100 supports the plurality of frozen confections C by their respective sticks S in an inverted orientation throughout the remainder of the confection forming operation.

Referring to FIG. 2, the extractor bar assembly 100 and a portion of the frozen stick-mounted confection forming machine is shown in greater detail. The extractor bar is positioned in a substantially horizontal position between housing walls 146 of the confection forming machine. The extractor bar assembly 100 is maintained in a horizontal position at each end thereof by tabs 106 which extend to rest on slide plates 148. The extractor bar is slid in the horizontal direction by a chain 150 which has extending pins 152 positioned to engage ears 104 for movement of the extractor bar in the horizontal direction. By further components of the frozen stick-mounted confection forming machine (not shown) the extractor bar may be moved in a vertical direction by engaging the tabs at each end of the extractor bar.

The extractor bar is fabricated from a first longitudinally extending member 154 and a second opposed longitudinally extending member 156 downwardly converging with the first member such that a V-shaped trough having a longitudinal bottom opening 157 between the extending members is formed. Located within the V-shaped trough is a longitudinally extending support rod 158 positioned between each end of the extractor bar. Although shown to be of circular cross section, the rod may be substantially any shape, such as oval, square or triangle. Each end of the rod is located in slotted recess 160 provided at each end of the extractor bar to retain the support rod within the trough. The slotted recess 160 allows support rod 158 to move between bottom surface 162 of the slotted recess 160 in an inclined direction substantially parallel to one opposed longitudinally extending member and top surface 164 of slotted recess 160. Although not shown, plates having corresponding slotted recesses may be positioned within the trough randomly along the length of the extractor bar to give the support rod additional guidance along its length when being moved from one position to another.

A plurality of tubular locking sleeves or segments 166, 168 and 170 are positioned along the length of support 158. Each of the tubular locking sleeves has an effective inside diameter greater than the effective outside diameter of the support rod 158 thereby allowing the tubular locking segments to be flotably mounted on the support rod 158. The floating fit compensates for variations in stick cross-section in the operation of extractor bar assembly 100.

The locking sleeve segments may be of equal length or alternatively of varied lengths. In the preferred embodiment, the sleeve segments are positioned in groups of three across the length of the rod, with each group corresponding to one frozen stick-mounted confection product. The middle sleeve 168 is generally shorter in length than its adjacent sleeves 166, 170 which may be of equal length. By way of example, the sleeves 166, 168, 170 may be 1¼ inches, ½ inch and 1¼ inches in length, respectively. The grouping of segments or sleeves in a sequence of three of various lengths will provide independent sleeve-stick contact to accommodate a wide range of frozen confection products including those with double sticks of various stick center to center distances. As a result of having each stick engaged by an independent locking sleeve there is greater locking strength of the extractor bar and subsequently improved extraction of the frozen stick-mounted confection products from their molds.

As previously described, the bottom of the extractor bar is provided with a plurality of apertures 108(a)–108(d). A release device 172 is strategically positioned within the frozen stick confection machine at a point in the cycle where the frozen confection products are to be released from the extractor bar assembly. The release device has a plurality of vertically extending release cams 174(a)–174(d) which are sized to freely enter the apertures to engage the support rod 158 and tubular locking sleeves 166, 168 and 170 for movement of the support rod in a relatively upward direction as provided for by the slotted recess 162 at each end of the extractor bar. Due to the length and flexibility of the rod 158 and tubular locking sleeve assembly, it is preferred that a plurality of release cams be provided. They are strategically located along the full length of the extractor bar assembly 100. The preferred location for the release cams is between adjacent confection products C corresponding to a series of three tubular locking sleeves 166, 168, 170. This spacing will provide uniform lift of the support rod 158 and locking sleeves 166, 168, 170 to assure simultaneous release of all the frozen stick-mounted confection products C within the extractor bar assembly 100 to minimize the loss of product during the operation of the confection forming machine.

The operation of the extractor bar assembly 100 will be described with reference to FIGS. 3–6. The frozen stick-mounted confection forming machine causes the extractor bar to be moved downward over the sticks S of the frozen confection products C subsequent to the completion of the molding process. Vertically extending stick S of flat cross section extending from frozen confection product C is caused to enter V-shaped trough 161 through bottom opening 157 as extractor bar assembly 100 moves downward. One side of the stick S abuts substantially vertical wall 178 of member 154 while the other side of stick S engages tubular locking sleeve 168. Specifically, as the stick S enters opening 157, support rod 158 and tubular locking sleeve 168 are automatically elevated in an upward direction, guided by slotted recess 160. The downward movement of extractor bar assembly 100 relative to stick S causes the support rod and tubular locking sleeves to rise up along inclined face 176 of the V-shaped trough from their initial position at the bottom surface 162 of the slotted recess. As the extractor bar moves further over the stick S, it gradually rotates and lifts the tubular locking sleeve and support rod assembly upward towards the top surface 164 of the slotted recess 160 until there is adequate clearance between the tubular locking sleeves and the vertical face 178 within the V-shaped trough for passage of the stick S. The tubular locking sleeves come into contact with backside 163 of stick S and, by the combination of the operation of gravity and friction, the stick S is maintained firmly between the tubular locking sleeve 168 and vertical face 178 at the point of contact 165 within the trough of the extractor bar. By virtue of the construction of the tubular locking sleeve and support rod assembly, the stick will be firmly retained within the extractor bar and downward force on the stick will tend to tighten the tubular locking sleeve's grip on the stick.

Annular region or clearance 159 between support rod 158 and the inside diameter of the tubular locking sleeve 166, 168, 170 provides for the floating fit of the sleeve on the support rod 158 thereby allowing each sleeve to function substantially independently of its adjacent sleeve and to accommodate variations in stick cross section.

Figure 4:
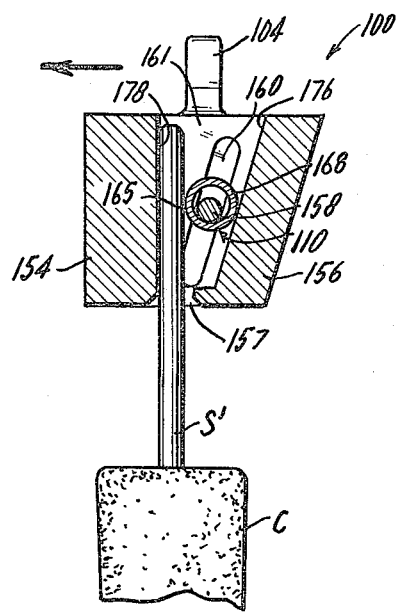
FIG. 4 is a section view of the extractor bar as shown in FIG. 3 showing the locking mechanism in engagement with a circular stick mounted confection product.

As shown in FIG. 4, a stick S' of circular cross-section is effectively locked within the extractor bar assembly in the same manner as the flat stick S described in reference to FIG. 3. Sticks of any shape or cross section may be employed in the extractor bar of this present invention. As shown in FIG. 4, the greater the effective diameter of the stick, the further up into the V-shaped trough the support rod 158 and tubular locking sleeves will travel to lock the stick between the vertical face 178 of member 154 and the point of contact 165 on the tubular locking sleeve.

In operation, after the frozen stick-mounted confection products are securely locked within the extractor bar assembly 100, the extractor bar assembly 100 is ready to extract the frozen stick-mounted confection products from their respective forming molds. Upward movement of the extractor bar assembly 100 causes the tubular locking sleeves on the support rod 158 to grip the sticks S secured within the extractor bar assembly 100 and the frozen stick-mounted confection products are suspended from the extractor bar by sticks S and advanced in such orientation through the confection forming machine. The frozen stick mounted confections C are carried to successive work stations (e.g., dipping, coating, packaging) in this orientation by the extractor bar. The products are conveyed by the extractor bar to a release station for disengaging the confections C from the extractor bar assembly 100.

Figure 5:
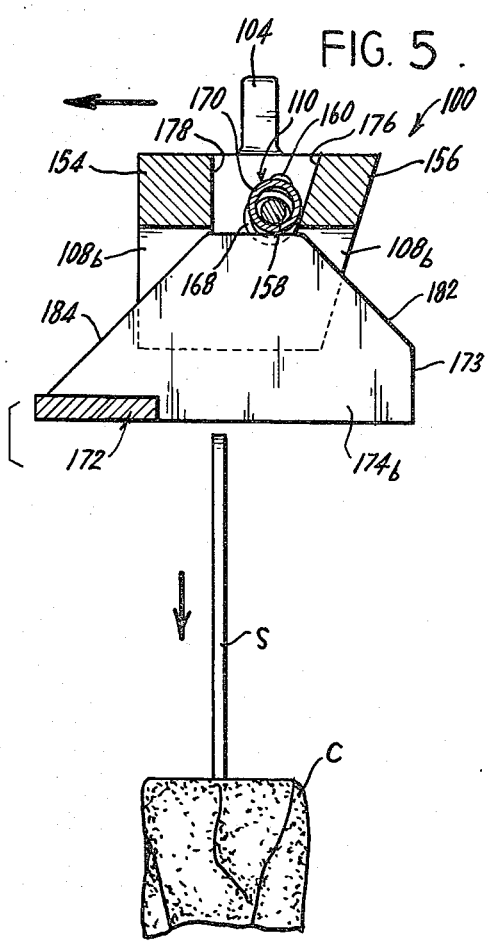
FIG. 5 is a sectional view taken along line 5—5 in FIG. 2 showing the locking mechanism displaced to the stick releasing position as a result of the action of the release bar; and, FIG. 6 is a sectioned side view of the extractor bar assembly showing the locking mechanism in its initial position prior to the engagement of a stick entering through the bottom opening.

FIG. 5 shows the orientation of the extractor bar release mechanism 172 located downstream of the final work station. As the extractor bar assembly 100 is moved in a horizontal direction, front edge 173 of release cam 174 enters the apertures 108 on the bottom side of the extractor bar assembly 100. Further horizontal movement of the extractor bar causes inclined surface 182 of the release cam 174 to engage the tubular locking sleeves. Continued forward motion causes the tubular locking sleeves to ride up the inclined face of the release bar, thereby causing the support rod 158 to travel in a relative upward and diverging direction relative to member 154 guided by slotted recess 160, away from the engaged stick S and vertical face 178. The upward, divergent motion of support rod 158 and the associated tubular locking sleeves releases the pressure on stick S and allows the stick-mounted confection C to be removed from the extractor bar assembly 100 by the force of gravity. The released confection C is deposited into receptacles for packaging.

Figure 6:
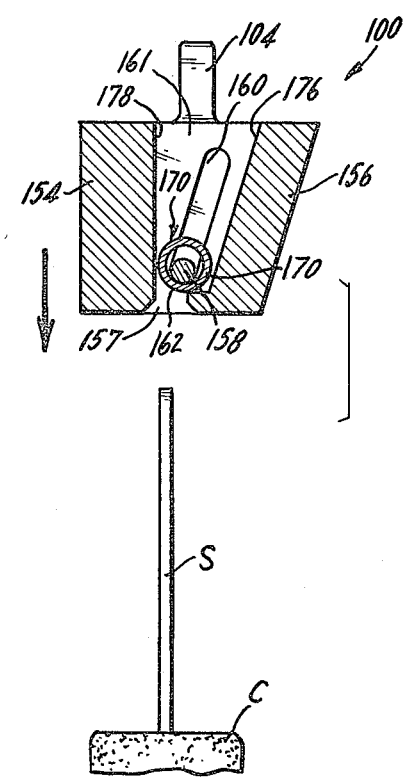

After release of the frozen stick-mounted confection products C, the support rod 158 rolls down the inclined surface 184 of the release bar until it reaches the bottom surface 162 of slotted recess 160 within the V-shaped trough as illustrated in FIG. 6. The extractor bar assembly 100 is now in its initial position to be returned to the first stage of the frozen stick-mounted confection forming machine where the process is repeated.

Although the invention herein has been described with reference to particular embodiments, it is to be understood that these embodiments are merely illustrative of the principles and application of the invention. Thus, it is to be understood that numerous modifications may be made in the illustrative embodiments and other arrangements may be deviced without departing from the spirit and scope of the invention as defined in the following claims and such claims should be broadly construed.

What is claimed is:

1. A combination stick locking and releasing device for use in a frozen stick-mounted confection forming machine comprising: a pair of opposed longitudinally extending members downwardly converging to define a trough having a longitudinally extending bottom opening between said members; an assembly having a longitudinally extending support means substantially parallel to said longitudinally extending members and a plurality of locking means positioned along the length of said support means, said assembly movable within said trough between a first stick locking position and a second stick releasing position whereby when said assembly is in said first position a stick entering said trough through said opening will be locked between one of said locking means and one of said members; and, means for moving said assembly from said first position to said second position.

2. The device of claim 1 wherein said support means comprises a laterally extending rod having a cross-section of a first effective diameter.

3. The device of claim 2 wherein said locking means comprises a plurality of tubular segments each having an inside diameter larger than said first effective diameter and flotably mounted on said rod along its length.

4. The device of claim 3 wherein said tubular segments are of a first length and a second shorter length.

5. A device for vertically extracting a molded frozen confection and stick product from a mold in a frozen stick-mounted confection forming machine wherein the molded confection product is formed with its stick portion extending upwardly from said mold, comprising: a first longitudinally extending member; a second opposed longitudinally extending member downwardly converging with said first member forming a trough having a longitudinally bottom opening between said members; a lock assembly including a longitudinally extending support member within said trough having a plurality of tubular sleeves flotatably positioned along the length of said support members; means for mounting said lock assembly within said trough movable between a first stick locking position and a second stick releasing position whereby when in said first position a stick entering said trough through said opening in a substantially vertical direction becomes fixed between at least one of said sleeves and one of said members such that effective upward vertical movement of said device will cause upward movement of the molded confection product; and means for upwardly moving said lock assembly from said first position to said second position for release of the molded confection product from said device.

6. An extractor bar of the cam lock roller type for vertically extracting a molded frozen confection product formed on an upwardly extending stick from its forming mold and for release of said frozen confection product from the extractor bar for packaging thereof subsequent to removal from said mold comprising: a first longitudinally extending member; a second opposed longitudinally extending member downwardly converging with said first member such that a V-shaped trough having a longitudinally extending bottom opening therebetween is formed; a longitudinally extending support rod movable within said trough between a first and a second position; a plurality of tubular locking sleeves flotably positioned along the length of said support rod for effective movement between said first and second positions, whereby a stick entering at a substantially vertical direction through said opening becomes locked between at least one of said sleeves and one of said members when said support rod is in said first position and upward movement of said extractor bar will extract the molded confection and stick product from a forming mold; and a plurality of transversely extending apertures across a bottom edge of said extending members constructed and arranged to receive a corresponding plurality of release cams for movement of said support rod and sleeves from said first to said second position to release said molded confection product from said extractor bar.

7. A combination stick locking and releasing device for use in a frozen stick-mounted confection forming machine comprising: a pair of opposed longitudinally extending members downwardly converging to define a trough having a longitudinally extending bottom opening between said members; an assembly having a longitudinally extending support means comprising a longitudinally extending rod having a cross-section of a first effective diameter and a plurality of locking means mounted on said rod, said locking means comprising a plurality of tubular segments each having an inside diameter larger than said first effective diameter and flotably mounted on said rod along the length of said rod, wherein said tubular segments are of a first length and a second shorter length; said assembly movable within said trough between a first stick locking position and a second stick releasing position whereby when said assembly is in said first position, a stick entering said trough through said opening will be locked between one of said locking means and one of said member; and, means for moving said assembly from said first position to said second position.

8. A combination stick locking and releasing device for use in a frozen stick-mounted confection forming machine comprising: a pair of opposed longitudinally extending members downwardly converging to define a trough having a longitudinally extending bottom opening between said members; an assembly having a longitudinally extending support means and a plurality of locking means positioned along the length of said support means, said assembly movable within said trough between a first stick locking position and a second stick releasing position whereby when said assembly is in said first position a stick entering said trough through said opening will be locked between one of said locking means and one of said members; means for moving said assembly from said first position to said second position; and a plurality of lateral apertures along the bottom edges of said longitudinally extending members and wherein said means for moving said assembly comprises a plurality of fixedly mounted cams in operative relationship to said assembly receivable within said longitudinally extending members through said plurality of apertures.

* * * * *